United States Patent
Jones, Jr.

[15] 3,703,746
[45] Nov. 28, 1972

[54] APPARATUS FOR PROCESSING SHRIMP AND RELATED SHELLFISH

[72] Inventor: John M. Jones, Jr., 206 Grubb Street, Hertford, N.C.

[22] Filed: Feb. 26, 1971

[21] Appl. No.: 119,206

[52] U.S. Cl. ........................ 17/71, 17/48, 17/73
[51] Int. Cl. .................................... A22c 29/00
[58] Field of Search .............. 17/71, 72, 73, 63, 48

[56] References Cited

UNITED STATES PATENTS

| | | | |
|---|---|---|---|
| 2,546,414 | 3/1951 | Abbott | 17/73 |
| 2,784,450 | 3/1957 | Jonsson | 17/48 |
| 2,799,643 | 7/1957 | Walker | 17/63 |
| 3,528,125 | 9/1970 | Jones, Jr. | 17/48 |
| 3,576,047 | 4/1971 | Willis | 17/73 |

Primary Examiner—Lucie H. Laudenslager
Attorney—Mason, Fenwick & Lawrence

[57] ABSTRACT

This apparatus is designed to take shrimp and related shellfish which have been freshly caught from the ocean and seas and process them on board a trawler whereby they may be immediately preserved in edible form. The apparatus includes a means for setting individual shellfish to excise the heads thereof, sequentially orienting the deheaded shellfish for conveyance to and through a deveining step, and sequentially deshelling the shellfish and thereafter grading them for storage.

11 Claims, 6 Drawing Figures

INVENTOR
JOHN M. JONES Jr.

BY
Mason, Fenwick & Lawrence
ATTORNEYS

INVENTOR
JOHN M. JONES Jr.

BY
Mason, Fenwick & Lawrence
ATTORNEYS

INVENTOR
JOHN M. JONES JR.

APPARATUS FOR PROCESSING SHRIMP AND RELATED SHELLFISH

BACKGROUND OF THE INVENTION

Earlier, John M. Jones, Sr. devised a means for deveining shrimp as represented by U.S. Pat. No. 2,684,500. That concept and others have since been substantially modified to result in the system described hereinafter, which is especially suited to utility on board fishing trawlers. Previously, the steps of sorting, deheading, deveining, shelling, grading, packaging, storing and the like could only be performed manually by the ship hands. These practices are so burdensome that they are never performed on board the trawler, to the detriment of the useful life of the shellfish in storage and prior to consumption.

This patent application relates to the apparatus which is disclosed in my earlier U.S. Pat. No. 3,528,125 granted Sept. 15, 1970, claiming only a method of processing shrimp and related shellfish.

FIELD OF THE INVENTION

The field of the invention is such as to include all shellfish having anatomy in conformation to that of the shrimp viz: seabobs, rock shrimp, Alaskan shrimp and the like.

DESCRIPTION OF THE PREFERRED EMBODIMENTS

The device comprises a portable unit 100 having removable sides 110—110' with handles 112—112', sides 120—120' and removable top 130 overlapping in part the initial conveying system 200.

Figure 1:
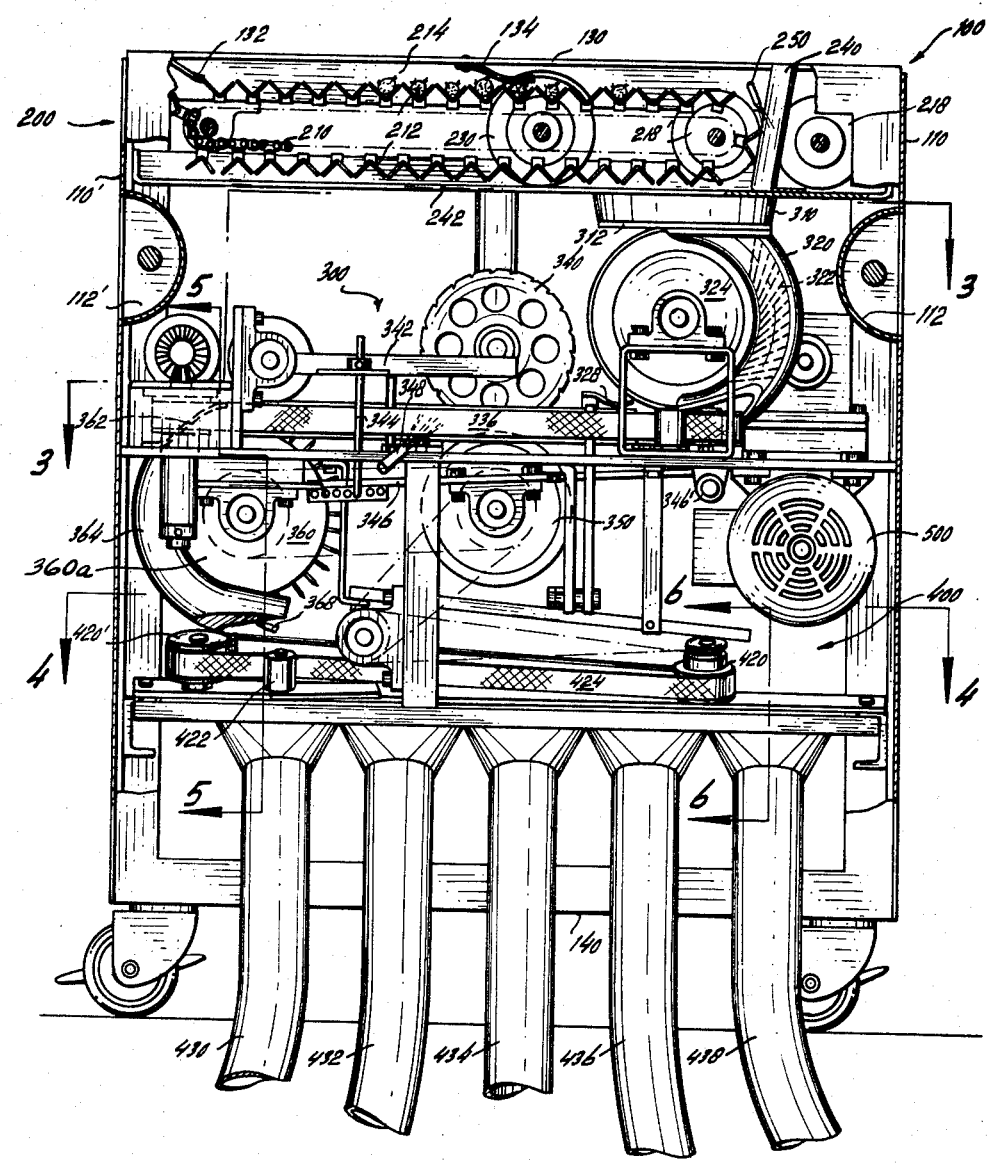
FIG. 1 is a view in side elevation of the invention, portions thereof being cut away to reveal the basic conveyor and related deveining and deshelling components.

Referring now to FIG. 1, the device 100 comprises essentially three levels 200, 300 and 400, the mechanisms of each level being generally represented by the series indicated.

Figure 2:
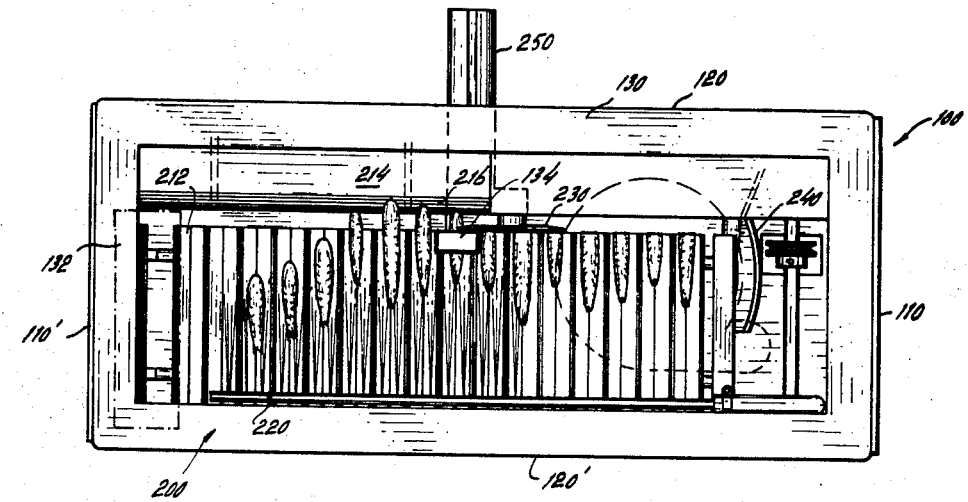
FIG. 2 is a top plan view of invention showing the deheading and conveying portion of the system.

Referring to the uppermost conveyor level 200, and to FIGS. 1 and 2, within the top cover is disposed a conveyor system 210 having links to which are secured independently movable shellfish troughs 212. The respective troughs are adapted to receive shellfish dropped on the delivery plate or chute 132 and to transport them generally in a clockwise direction immediately adjacent the graduated positioner slide plate 214 and immediately beneath the path defined by the horizontally disposed spray component 220. Drive for the system is coupled from motor 500 by pulley 218 and take-off wheel 218'. Attached to the cover 130 is a spring steel plate holder 134, which is adapted to secure the positioned shellfish into the seat formed by the respective troughs simultaneously as the heads are severed from the shellfish by action of the deheader blade 230. In practice, the shellfish are individually dropped on to the delivery plate 132 (head to left), and transported clockwise via the troughs 212, whereupon the respective shellfish are positioned headfirst by the action of the sprays 220 against the horizontally graduated slide plate 214. The slide plate is disposed at an angle and has shellfish head engaging grooves 216, adapted to effect correct transverse positioning of shellfish of varying size with respect to the deheader 230. The sprays 220, being directed to the base of the respective troughs, are discontinued at a position which is substantially adjacent the axis of the deheader 230. In the vicinity of the delivery chute 240, the action of the deheaded shell fish in transfer is augmented by the water spray 250, directed adjustably angularly downwardly with respect to the chute 240. The fixed trough underlying the conveyor, represented by the numeral 242, provides a base for the chute 240 and is sloped in the direction of the water spray 250 to dispose of the water accumulated by the various sprays 220 and 250 used in positioning and in dislodging the shellfish from the conveyor.

Figure 3:
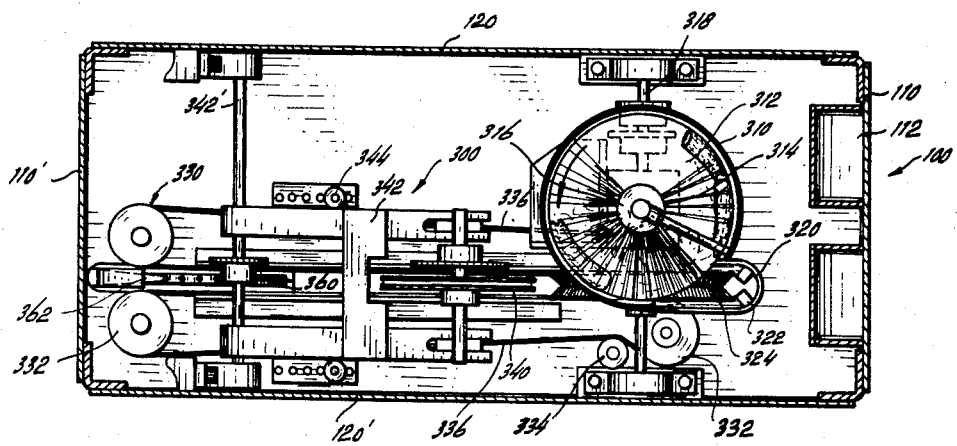
FIG. 3 is a view of the invention taken along the lines 3—3 of FIG. 1 showing the transfer and deveining portions of the system.
Figure 4:
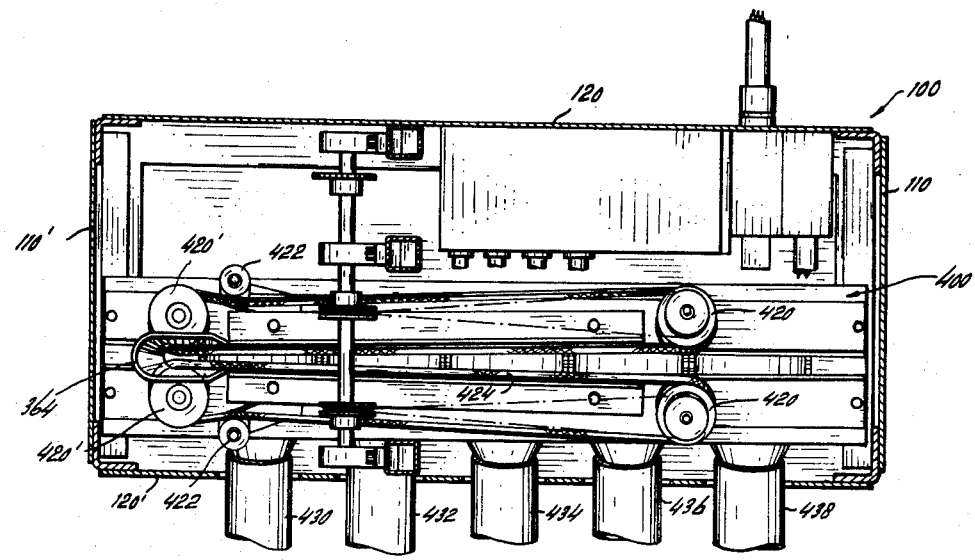
FIG. 4 is a sectional view of invention taken along the lines 4—4 of FIG. 1 revealing the means for movably grading deveined and deshelled shellfish.
Figure 5:
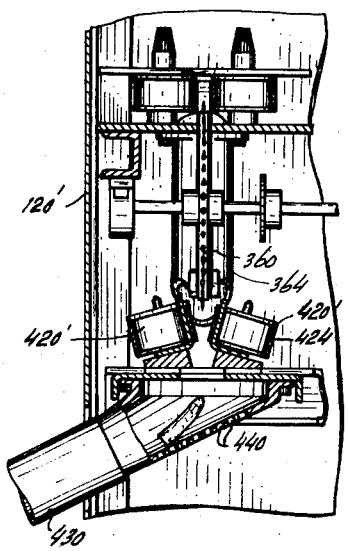
FIG. 5 is a vertical sectional view in fragment of that portion of invention comprising the deshelling and grading, illustrated in FIG. 1.
Figure 6:
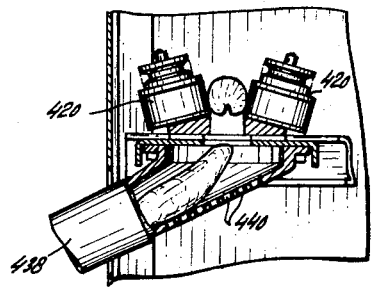
FIG. 6 is a vertical sectional view of the grading system illustrated in FIG. 1 at 6—6 thereof, shown in fragment.

The second treatment level represented by the series 300 is best shown in FIGS. 1 and 3. The level 300 of the embodiment shown includes the turntable housing 310 having the turntable 312 disposed centrally thereof. The turntable is preferably radially grooved to provide a friction surface for the shellfish. An arcuately coaxial spray element 314 comprises in the right-hand-most portion at least five sprays which are adapted to jet against the circular walls of the housing 310, keeping the shellfish on their right sides and preventing the backs thereof from sliding toward the center of the turntable or dropping on their left sides. Moving by the turntable in a counterclockwise direction, as shown, the shrimp are engaged by other plural sprays 316 emanating from the center of the turntable outwardly to the sides, which are adapted to increase in force by a peculiar sizing of the apertures forming the spray nozzle. The apertures are preferably square and increase in magnitude counterclockwise from the area generally indicated as at 10 o'clock to the area generally indicated as approximately 4 o'clock. These sprays 316 are adapted to force the shrimp to stand on their feet and to enter the feeding chute 320 headless end first, whereby the spring elements 322 engage the back of the shrimp, forcing the legs thereof into the v-shaped cavity of the transfer wheel 324. Thus the respective shellfish are urged against the transfer wheel feet in, back out, to be received by the conveyor 336 feet up, back down, and secured therein for compression conveyance beyond that point. Then the shellfish are depressed downwardly thereafter by the compressor spring 328 (FIG. 1), prior to further adjustable compression by the wheel 340. The wheel 340 is mounted in lever engagement via the adjustable pin 344 with a corresponding lever element 346 seating with pivot 346' the severing and deveining blade 350 into corresponding registry, irrespective of size of the shrimp. Thus, the compression wheel 340 and severing wheel 350, although they may be adjusted axially at any suitable distance, are adapted to ride upward and downward of the conveyor 336 depending upon the size of the shrimp passing thereunder. As the wheel 340 rides up over a large shellfish, the deveiner wheel 350, would move upward proportionately by action of connecting lever 342 pivoting at 342' and pin 344 coupled to lever element 346 supporting deveiner wheel 350. The conveyor has suitable tension means 334 –334' indicated as pulleys intermediate the sheave ends of the respective conveyor belts 336 on either side of the track. The conveyor is set on pulleys 330–332 and driven by drive 318, connected in turn to the motor 500. Following the cleaning station indicated by the compressor 340 and severing wheel 350, the shrimp are transported by the compression engagement of opposed belts 336 to the transfer station generally indicated at 360 including tined wheel 360a and deflector 362. This tined wheel 360a is adapted for tine engagement with the shrimp to pull them from the abraded compression action of the conveyor belts 336, whereby the shells are removed from the body and the meat transferred arcuately downwardly through the chute 364 to be forcibly ejected by the fixed plow prong 368 and thereafter to be engaged by the grader conveyor 400 hereinafter described.

Referring now to the grading system 400 appearing on the third and lowermost level from the top and shown particularly in FIGS. 1, 4, 5 and 6 respectively, the now-deshelled and deveined meat has been transferred through the arcuate funnel 364 by means of the tined wheel 360a and removed therefrom by the fixed plow prong 368 for deposit, irrespective of size, on the angularly divergent belts represented by the numeral 424. Adjustment to the belts 424 is effected through corresponding elements 422, found adjacent the pulleys 420'. The pulleys 420' are aligned with the chute axis of the component 364, to receive in moving contact the respective meats. It will be noted that the opposed belt sheaves 420 are spatially separated transversely a greater distance than the corresponding sheaves 420', thereby yielding an increased gap in the conveyor system components to deposit the respective shrimp size for size in the grading chutes 430, 432, 434, 436 and 438 respectively for freezing and storage thereafter. The chutes are foraminous at 440 to relieve water spray residue.

The foregoing description being by way of illustration only, the invention is limited by the appended claims alone.

What is claimed is:

1. In the dressing of non-graded shellfish, portable apparatus including:
   A. a first shellfish conveyor having deposit and removal ends and fluid means associated therewith to position the shellfish for deheading;
   B. shellfish deheading means aligned adjacent the first conveyor;
   C. deheaded shellfish transfer means adjacent the removal end of the first conveyor, whereby the shellfish may be positioned for deveining conveyance;
   D. second conveying means securing the oriented shellfish feet up - back down; and
   E. a compression-deveining station in the path of the second conveying means;
   F. a shellfish deshelling-transfer station in the path of the second conveying means; and
   G. third conveying means adapted to grading of the dressed shellfish.

2. Apparatus according to claim 1 wherein the respective conveying means are superposed.

3. Apparatus according to claim 1 including fixed shellfish grading means adjacent the first conveyor, said fixed shellfish grading means being adapted to transverse positioning of the shellfish for deheading thereof.

4. Shellfish according to claim 1 wherein the first conveyor comprises transverse plural troughs, and the fluid means include plural jets longitudinally disposed in overlying relationship to the troughs, to jet the shellfish and shift same progressively transversely of said troughs.

5. Apparatus according to claim 1 including fixed shellfish grading means adjacent the first conveyor, said grading means being adapted to transverse positioning of the shellfish for deheading thereof and wherein the first conveyor comprises transverse plural troughs, the fluid means include plural jets longitudinally disposed in overlying relationship to said troughs, to shift the shellfish progressively transversely of said troughs.

6. Apparatus according to claim 1 wherein the second conveying means comprises a pair of belts engaging opposite sides of the shrimp and transporting the same by compression engagement to said compression-deveining station and said deshelling-transfer station, the latter station including a tined wheel having tines for impaling the shrimp bodies transferred thereto and transferring them arcuately downwardly, and said conveyor belts exerting abraded compression action on the shrimp when they reach said tined wheel and are impaled thereon whereby the shells are removed from the body as the shrimp meat is transferred arcuately downwardly by the tined wheel.

7. Apparatus according to claim 1 wherein the deshelling transfer station comprises forcible meat ejection means aligned with said second conveying means.

8. Apparatus according to claim 7 wherein the third conveying means comprises complemental divergent compression confinement means.

9. Apparatus according to claim 8 further comprising plural grading chutes disposed in alignment with said third conveying means for gravitational deposit of the graded, dressed shellfish from said conveyor.

10. Apparatus according to claim 8 wherein the respective conveying means are superposed, the first being above the second and the second above the third.

11. Apparatus according to claim 9 wherein the respective conveying means are superposed, the first being above the second and the second above the third and wherein said grading chutes are disposed substantially beneath the third said conveying means.

* * * * *